United States Patent
Wright

(10) Patent No.: US 11,978,043 B2
(45) Date of Patent: May 7, 2024

(54) TIME LOCK TECHNIQUE FOR SECURING A RESOURCE ON A BLOCKCHAIN

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 325 days.

(21) Appl. No.: 16/645,437

(22) PCT Filed: Sep. 4, 2018

(86) PCT No.: PCT/IB2018/056734
§ 371 (c)(1),
(2) Date: Mar. 6, 2020

(87) PCT Pub. No.: WO2019/049022
PCT Pub. Date: Mar. 14, 2019

(65) Prior Publication Data
US 2020/0279256 A1     Sep. 3, 2020

(30) Foreign Application Priority Data

Sep. 8, 2017  (GB) ...................................... 1714517
Sep. 8, 2017  (WO) .................. PCT/IB2017/055430

(51) Int. Cl.
G06Q 20/38    (2012.01)
G06Q 20/40    (2012.01)
(Continued)

(52) U.S. Cl.
CPC ... *G06Q 20/3829* (2013.01); *G06Q 20/40155* (2020.05); *H04L 9/0643* (2013.01);
(Continued)

(58) Field of Classification Search
CPC ......... G06Q 20/3829; G06Q 20/40155; G06Q 2220/00; H04L 9/0643; H04L 9/3236; H04L 2209/38; H04L 9/3297; H04L 9/50
See application file for complete search history.

(56) References Cited

U.S. PATENT DOCUMENTS 10,050,779 B2     8/2018  Alness et al.
10,523,443 B1 *  12/2019  Kleinman ................. H04L 9/30
(Continued)

FOREIGN PATENT DOCUMENTS

WO      2017145019 A1       8/2017
WO   WO-2017136643 A1 *     8/2017 ............. G06F 16/00

OTHER PUBLICATIONS

Andreas M. Antonopoulos, Chapter 7 of Mastering Bitcoin, Jul. 2017, O'Reily Media (Year: 2017).*

(Continued)

*Primary Examiner* — Neha Patel
*Assistant Examiner* — Chunling Ding
(74) *Attorney, Agent, or Firm* — Davis Wright Tremaine LLP

(57) ABSTRACT

The invention comprises a solution for securing an output (UTXO) in a single blockchain (e.g. Bitcoin) transaction (TX) so that it can only be unlocked by an authorised party at an allowed time, and in accordance with external data supplied to the transaction's locking script. The invention may comprise two steps which are implemented within a redeem script provided within the UTXO's locking script: 1) Calculation of a time-related value (which we will call $T_{supplied}$) using the external data provided; and 2) use of the calculated $T_{supplied}$ value in a time lock technique to ensure that unlocking occurs at a time pre-determined time. The invention allows external data to be introduced into the time lock control of a transaction on the blockchain. It also includes a technique for combining absolute and relative (Continued)

time locks (e.g. CLTV and CSV as known in the Bitcoin protocol).

15 Claims, 7 Drawing Sheets

(51) Int. Cl.
  *H04L 9/06* (2006.01)
  *H04L 9/32* (2006.01)
  *H04L 9/00* (2022.01)
(52) U.S. Cl.
  CPC ....... *H04L 9/3236* (2013.01); *G06Q 2220/00* (2013.01); *H04L 9/50* (2022.05)

(56) References Cited

U.S. PATENT DOCUMENTS

| | | | |
|---|---|---|---|
| 2007/0245159 A1* | 10/2007 | Youn | H04L 9/3236 713/181 |
| 2016/0070636 A1* | 3/2016 | Furtwangler | G06F 8/72 717/126 |
| 2017/0187569 A1* | 6/2017 | Shiraki | H04L 41/122 |

OTHER PUBLICATIONS

BtcDrak, CHECKSEQUENCEVERIFY, 2015, GitHub (Year: 2015).*
Andreas M. Antonopoulos, Chapter 7 of Mastering Bitcoin, Jul. 2017, O'Reilly Media (Year: 2017).*
BtcDrak, CHECKSEQUENCEVERIFY, Aug. 2015, GitHub (Year: 2015).*
Rusty Russell, Reaching The Ground With Lightning (draft 0.2), 2015, GitHub (Year: 2015).*
Martin Hell, Blockchain-based publishing layer for the Keyless Signing Infrastructure, 2016, IEEE (Year: 2016).*
Peter Todd, OP_CHECKLOCKTIMEVERIFY, Oct. 2014, GitHub (Year: 2014).*
Xingjie Yu, Fair Deposit against Double-Spending for Bitcoin Transactions, Aug. 2017, IEEE (Year: 2017).*
Antonopoulos, "Mastering Bitcoin—Unlocking Digital Cryptocurrencies," O'Reilly Media, Inc., Dec. 20, 2014, 282 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Ciyam et al., "Why Can't I Use a Negative Value for OP_CHECKLOCKTIMEVERIFY," Bitcoin Forum, https://bitcointalk.org/index.php?topic=1313175.0, Jan. 12, 2018, 9 pages.
Dorier et al., "Re: Is it Safe to Use CLTV for Recurring Payments?," Reddit Forum, https://www.reddit.com/r/Bitcoin/comments/4kit49/is_it_safe_to_use_cltv_for_recurring_payments/, May 22, 2016, 5 pages.
Edwin, "Is it Safe to Use CLTV for Recurring Payments," BitCoin News, https://bitcoinonair.wordpress.com/2016/05/22/is-it-safe-to-use-cltv-for-recurring-payments/, May 22, 2016, 2 pages.
International Search Report and Written Opinion dated May 24, 2018, Patent Application No. PCT/IB2017/055430, 11 pages.
International Search Report and Written Opinion dated Nov. 26, 2018, Patent Application No. PCT/IB2018/056734, 11 pages.
Jadefalke et al., "Re: [ANN] SLING | Fully Working Decentralized Market in Wallet | Sling Market Live," bintalk.org/index.php?topic=1032166.3255, Jan. 12, 2018, 6 pages.
Justanotheruser et al., "Transcript for #bitcoin-dev Mar. 18, 2014," http://bitcoinstats.com/irc/bitcoin-dev/logs/2014/03/18, Mar. 18, 2014, 15 pages.
Mccorry et al., "Towards Bitcoin Payment Networks," Australasian Conference on Information Security and Privacy, Jul. 4, 2016, 20 pages.
Moser et al., "Bitcoin Covenants," retrieved from fc16.ifca.ai/bitcoin/papers/MES16.pdf, Feb. 2016, 16 pages.
Nakamoto, "Bitcoin: A Peer-to-Peer Electronic Cash System," Bitcoin, Oct. 31, 2008, https://bitcoin.org/bitcoin.pdf, 9 pages.
Poon, "SIGHASH_NOINPUT in Segregated Witness," retrieved from https://bitcoin-development.narkive.com/ByYWXcxA/sighash-noinput, 2016, 7 pages.
Satoshi et al., "Connection Limits," Bitcoin Forum, Aug. 9, 2010, https://bitcointalk.org/index.php?topic=741.0; prev_next=prev, 2 pages.
Slayer, "Sling Development Tree," https://bitbucket.org/dgslayer/sling/src/J299554ae22149e387440560675809a3fe0106cb?, 2015, 2 pages.
Todd et al., "bips/bip-0065.mediawiki," GitHub, Jan. 6, 2016, https://github.com/bitcoin/bips/blob/d37084d4baba1b88a849f1a7131f, 5 pages.
UK Commercial Search Report dated Jan. 19, 2018, Patent Application No. GB1714517.8, 5 pages.
UK IPO Search Report dated Feb. 7, 2018, Patent Application No. GB1714517.8, 11 pages.
Yu et al., "Fair Deposits Against Double-Speinding for Bitcoin Transactions," Research Collection School of Information Systems, Singapore Management University, Aug. 2017, 9 pages.

* cited by examiner

FIG. 2

| | A | B | C | D | E | F | G | H | I |
|---|---|---|---|---|---|---|---|---|---|
| 1 | T(Supplied) | T(CSV) | | T(CLTV) | | NOT [ T(CLTV) - 1] | | (A). NOT (B) | (A).NOT (B). ( C ) |
| 2 | | C | | A | | B | | | |
| 3 | 90 | -10 | 0 | 90 | 1 | 91 | 1 | 0 | 0 |
| 4 | 91 | -9 | 0 | 91 | 1 | 92 | 1 | 0 | 0 |
| 5 | 92 | -8 | 0 | 92 | 1 | 93 | 1 | 0 | 0 |
| 6 | 93 | -7 | 0 | 93 | 1 | 94 | 1 | 0 | 0 |
| 7 | 94 | -6 | 0 | 94 | 1 | 95 | 1 | 0 | 0 |
| 8 | 95 | -5 | 0 | 95 | 1 | 96 | 1 | 0 | 0 |
| 9 | 96 | -4 | 0 | 96 | 1 | 97 | 1 | 0 | 0 |
| 10 | 97 | -3 | 0 | 97 | 1 | 98 | 1 | 0 | 0 |
| 11 | 98 | -2 | 0 | 98 | 1 | 99 | 1 | 0 | 0 |
| 12 | 99 | -1 | 0 | 99 | 1 | 100 | 1 | 0 | 0 |
| 13 | 100 | 0 | 1 | 100 | 1 | 101 | 1 | 0 | 0 |
| 14 | 101 | 1 | 1 | 101 | 1 | 102 | 1 | 0 | 0 |
| 15 | 102 | 2 | 1 | 102 | 1 | 103 | 1 | 0 | 0 |
| 16 | 103 | 3 | 1 | 103 | 1 | 104 | 1 | 0 | 0 |
| 17 | 104 | 4 | 1 | 104 | 1 | 105 | 1 | 0 | 0 |
| 18 | 105 | 5 | 1 | 105 | 1 | 106 | 1 | 0 | 0 |
| 19 | 106 | 6 | 1 | 106 | 1 | 107 | 1 | 0 | 0 |
| 20 | 107 | 7 | 1 | 107 | 1 | 108 | 1 | 0 | 0 |
| 21 | 108 | 8 | 1 | 108 | 1 | 109 | 0 | 1 | 1 |
| 22 | 109 | 9 | 0 | 109 | 0 | 110 | 0 | 0 | 0 |
| 23 | 110 | 10 | 0 | 110 | 0 | 111 | 0 | 0 | 0 |
| 24 | 111 | 11 | 0 | 111 | 0 | 112 | 0 | 0 | 0 |
| 25 | 112 | 12 | 0 | 112 | 0 | 113 | 0 | 0 | 0 |
| 26 | 113 | 13 | 0 | 113 | 0 | 114 | 0 | 0 | 0 |
| 27 | 114 | 14 | 0 | 114 | 0 | 115 | 0 | 0 | 0 |
| 28 | 115 | 15 | 0 | 115 | 0 | 116 | 0 | 0 | 0 |
| 29 | 116 | 16 | 0 | 116 | 0 | 117 | 0 | 0 | 0 |
| 30 | 117 | 17 | 0 | 117 | 0 | 118 | 0 | 0 | 0 |
| 31 | 118 | 18 | 0 | 118 | 0 | 119 | 0 | 0 | 0 |
| 32 | 119 | 19 | 0 | 119 | 0 | 120 | 0 | 0 | 0 |
| 33 | 120 | 20 | 0 | 120 | 0 | 121 | 0 | 0 | 0 |
| 37 | T(Now) | | 108 | Variable - changes each block | | | | T(Now) must be larger than T(0) | |
| 38 | T(0) | | 100 | Initial Script value - fixed | | | | | |
| 39 | SCV - Const | | 8 | | | | | | |

FIG. 3

| | A | B | C | D | E | F | G | H | I |
|---|---|---|---|---|---|---|---|---|---|
| 1 | T(Supplied) | T(CSV) | | T(CLTV) | | NOT [ T(CLTV) - 1] | | (A). NOT (B) | (A).NOT (B). ( C ) |
| 2 | | C | | A | | B | | | |
| 3 | 90 | -37 | 0 | 90 | 1 | 91 | 1 | 0 | 0 |
| 4 | 91 | -26 | 0 | 91 | 1 | 92 | 1 | 0 | 0 |
| 5 | 92 | -25 | 0 | 92 | 1 | 93 | 1 | 0 | 0 |
| 6 | 93 | -24 | 0 | 93 | 1 | 94 | 1 | 0 | 0 |
| 7 | 94 | -23 | 0 | 94 | 1 | 95 | 1 | 0 | 0 |
| 8 | 95 | -22 | 0 | 95 | 1 | 96 | 1 | 0 | 0 |
| 9 | 96 | -21 | 0 | 96 | 1 | 97 | 1 | 0 | 0 |
| 10 | 97 | -20 | 0 | 97 | 1 | 98 | 1 | 0 | 0 |
| 11 | 98 | -19 | 0 | 98 | 1 | 99 | 1 | 0 | 0 |
| 12 | 99 | -18 | 0 | 99 | 1 | 100 | 1 | 0 | 0 |
| 13 | 100 | -17 | 0 | 100 | 1 | 101 | 1 | 0 | 0 |
| 14 | 101 | -16 | 0 | 101 | 1 | 102 | 1 | 0 | 0 |
| 15 | 102 | -15 | 0 | 102 | 1 | 103 | 1 | 0 | 0 |
| 16 | 103 | -14 | 0 | 103 | 1 | 104 | 1 | 0 | 0 |
| 17 | 104 | -13 | 0 | 104 | 1 | 105 | 1 | 0 | 0 |
| 18 | 105 | -12 | 0 | 105 | 1 | 106 | 1 | 0 | 0 |
| 19 | 106 | -11 | 0 | 106 | 1 | 107 | 1 | 0 | 0 |
| 20 | 107 | -10 | 0 | 107 | 1 | 108 | 1 | 0 | 0 |
| 21 | 108 | -9 | 0 | 108 | 1 | 109 | 1 | 0 | 0 |
| 22 | 109 | -8 | 0 | 109 | 1 | 110 | 1 | 0 | 0 |
| 23 | 110 | -7 | 0 | 110 | 1 | 111 | 1 | 0 | 0 |
| 24 | 111 | -6 | 0 | 111 | 1 | 112 | 1 | 0 | 0 |
| 25 | 112 | -5 | 0 | 112 | 1 | 113 | 1 | 0 | 0 |
| 26 | 113 | -4 | 0 | 113 | 1 | 114 | 1 | 0 | 0 |
| 27 | 114 | -3 | 0 | 114 | 1 | 115 | 1 | 0 | 0 |
| 28 | 115 | -2 | 0 | 115 | 1 | 116 | 1 | 0 | 0 |
| 29 | 116 | -1 | 0 | 116 | 1 | 117 | 1 | 0 | 0 |
| 30 | 117 | 0 | 1 | 117 | 1 | 118 | 1 | 0 | 0 |
| 31 | 118 | 1 | 1 | 118 | 1 | 119 | 0 | 1 | 1 |
| 32 | 119 | 2 | 0 | 119 | 0 | 120 | 0 | 0 | 0 |
| 33 | 120 | 3 | 0 | 120 | 0 | 121 | 0 | 0 | 0 |
| 37 | T(Now) | | 118 | Variable - changes each block | | | | T(Now) must be larger than T(0) | |
| 38 | T(0) | | 117 | Initial Script value - fixed | | | | | |
| 39 | SCV - Const | | 1 | | | | | | |

FIG. 4

| | A | B | C | D | E | F | G | H | I |
|---|---|---|---|---|---|---|---|---|---|
| 1 | T(Supplied) | T(CSV) | | T(CLTV) | | NOT [ T(CLTV) - 1] | | (A ). NOT (B) | (A ).NOT (B). ( C ) |
| 2 | | C | | A | | B | | | |
| 3 | 90 | -10 | 0 | 90 | 1 | 91 | 1 | 0 | 0 |
| 4 | 91 | -9 | 0 | 91 | 1 | 92 | 1 | 0 | 0 |
| 5 | 92 | -8 | 0 | 92 | 1 | 93 | 1 | 0 | 0 |
| 6 | 93 | -7 | 0 | 93 | 1 | 94 | 1 | 0 | 0 |
| 7 | 94 | -6 | 0 | 94 | 1 | 95 | 1 | 0 | 0 |
| 8 | 95 | -5 | 0 | 95 | 1 | 96 | 1 | 0 | 0 |
| 9 | 96 | -4 | 0 | 96 | 1 | 97 | 1 | 0 | 0 |
| 10 | 97 | -3 | 0 | 97 | 1 | 98 | 1 | 0 | 0 |
| 11 | 98 | -2 | 0 | 98 | 1 | 99 | 1 | 0 | 0 |
| 12 | 99 | -1 | 0 | 99 | 1 | 100 | 1 | 0 | 0 |
| 13 | 100 | 0 | 1 | 100 | 1 | 101 | 1 | 0 | 0 |
| 14 | 101 | 1 | 1 | 101 | 1 | 102 | 1 | 0 | 0 |
| 15 | 102 | 2 | 1 | 102 | 1 | 103 | 1 | 0 | 0 |
| 16 | 103 | 3 | 1 | 103 | 1 | 104 | 1 | 0 | 0 |
| 17 | 104 | 4 | 1 | 104 | 1 | 105 | 1 | 0 | 0 |
| 18 | 105 | 5 | 1 | 105 | 1 | 106 | 1 | 0 | 0 |
| 19 | 106 | 6 | 1 | 106 | 1 | 107 | 1 | 0 | 0 |
| 20 | 107 | 7 | 1 | 107 | 1 | 108 | 1 | 0 | 0 |
| 21 | 108 | 8 | 1 | 108 | 1 | 109 | 1 | 0 | 0 |
| 22 | 109 | 9 | 1 | 109 | 1 | 110 | 1 | 0 | 0 |
| 23 | 110 | 10 | 1 | 110 | 1 | 111 | 1 | 0 | 0 |
| 24 | 111 | 11 | 1 | 111 | 1 | 112 | 1 | 0 | 0 |
| 25 | 112 | 12 | 1 | 112 | 1 | 113 | 1 | 0 | 0 |
| 26 | 113 | 13 | 1 | 113 | 1 | 114 | 1 | 0 | 0 |
| 27 | 114 | 14 | 1 | 114 | 1 | 115 | 1 | 0 | 0 |
| 28 | 115 | 15 | 1 | 115 | 1 | 116 | 0 | 1 | 1 |
| 29 | 116 | 16 | 0 | 116 | 0 | 117 | 0 | 0 | 0 |
| 30 | 117 | 17 | 0 | 117 | 0 | 118 | 0 | 0 | 0 |
| 31 | 118 | 18 | 0 | 118 | 0 | 119 | 0 | 0 | 0 |
| 32 | 119 | 19 | 0 | 119 | 0 | 120 | 0 | 0 | 0 |
| 33 | 120 | 20 | 0 | 120 | 0 | 121 | 0 | 0 | 0 |
| 34 | | | | | | | | | |
| 35 | | | | | | | | | |
| 36 | | | | | | | | | |
| 37 | T(Now) | | 115 | Variable - changes each block | | | | T(Now) must be larger than T(0) | |
| 38 | T(0) | | 100 | Initial Script value - fixed | | | | | |
| 39 | SCV - Const | | 15 | | | | | | |
| 40 | | | | | | | | | |

FIG. 5

| | A | B | C | D | E | F | G | H | I |
|---|---|---|---|---|---|---|---|---|---|
| 1 | T(Supplied) | T(CSV) | | T(CLTV) | | NOT [ T(CLTV) - 1] | | (A). NOT (B) | (A).NOT (B). ( C ) |
| 2 | | | C | | A | | B | | |
| 3 | 90 | -5 | 0 | 90 | 1 | 91 | 1 | 0 | 0 |
| 4 | 91 | -4 | 0 | 91 | 1 | 92 | 1 | 0 | 0 |
| 5 | 92 | -3 | 0 | 92 | 1 | 93 | 1 | 0 | 0 |
| 6 | 93 | -2 | 0 | 93 | 1 | 94 | 1 | 0 | 0 |
| 7 | 94 | -1 | 0 | 94 | 1 | 95 | 1 | 0 | 0 |
| 8 | 95 | 0 | 1 | 95 | 1 | 96 | 1 | 0 | 0 |
| 9 | 96 | 1 | 1 | 96 | 1 | 97 | 1 | 0 | 0 |
| 10 | 97 | 2 | 1 | 97 | 1 | 98 | 1 | 0 | 0 |
| 11 | 98 | 3 | 1 | 98 | 1 | 99 | 1 | 0 | 0 |
| 12 | 99 | 4 | 1 | 99 | 1 | 100 | 1 | 0 | 0 |
| 13 | 100 | 5 | 1 | 100 | 1 | 101 | 1 | 0 | 0 |
| 14 | 101 | 6 | 1 | 101 | 1 | 102 | 1 | 0 | 0 |
| 15 | 102 | 7 | 1 | 102 | 1 | 103 | 1 | 0 | 0 |
| 16 | 103 | 8 | 1 | 103 | 1 | 104 | 1 | 0 | 0 |
| 17 | 104 | 9 | 1 | 104 | 1 | 105 | 1 | 0 | 0 |
| 18 | 105 | 10 | 1 | 105 | 1 | 106 | 1 | 0 | 0 |
| 19 | 106 | 11 | 1 | 106 | 1 | 107 | 1 | 0 | 0 |
| 20 | 107 | 12 | 1 | 107 | 1 | 108 | 1 | 0 | 0 |
| 21 | 108 | 13 | 1 | 108 | 1 | 109 | 1 | 0 | 0 |
| 22 | 109 | 14 | 1 | 109 | 1 | 110 | 1 | 0 | 0 |
| 23 | 110 | 15 | 1 | 110 | 1 | 111 | 1 | 0 | 0 |
| 24 | 111 | 16 | 1 | 111 | 1 | 112 | 1 | 0 | 0 |
| 25 | 112 | 17 | 1 | 112 | 1 | 113 | 1 | 0 | 0 |
| 26 | 113 | 18 | 1 | 113 | 1 | 114 | 1 | 0 | 0 |
| 27 | 114 | 19 | 1 | 114 | 1 | 115 | 1 | 0 | 0 |
| 28 | 115 | 20 | 1 | 115 | 1 | 116 | 0 | 1 | 1 |
| 29 | 116 | 21 | 0 | 116 | 0 | 117 | 0 | 0 | 0 |
| 30 | 117 | 22 | 0 | 117 | 0 | 118 | 0 | 0 | 0 |
| 31 | 118 | 23 | 0 | 118 | 0 | 119 | 0 | 0 | 0 |
| 32 | 119 | 24 | 0 | 119 | 0 | 120 | 0 | 0 | 0 |
| 33 | 120 | 25 | 0 | 120 | 0 | 121 | 0 | 0 | 0 |
| 37 | T(Now) | | 115 | Variable - changes each block | | | | T(Now) must be larger than T(0) | |
| 38 | T(0) | | 95 | Initial Script value - fixed | | | | | |
| 39 | SCV - Const | | 20 | | | | | | |

FIG. 6

| | A | B | C | D | E | F | G | H | I |
|---|---|---|---|---|---|---|---|---|---|
| 1 | T(Supplied) | T(CSV) | | T(CLTV) | | NOT [ T(CLTV) - 1] | | (A) . NOT (B) | (A) . NOT (B) . ( C ) |
| 2 | | C | | A | | B | | | |
| 3 | 90 | -5 | 0 | 90 | 1 | 91 | 0 | 1 | 0 |
| 4 | 91 | -4 | 0 | 91 | 0 | 92 | 0 | 0 | 0 |
| 5 | 92 | -3 | 0 | 92 | 0 | 93 | 0 | 0 | 0 |
| 6 | 93 | -2 | 0 | 93 | 0 | 94 | 0 | 0 | 0 |
| 7 | 94 | -1 | 0 | 94 | 0 | 95 | 0 | 0 | 0 |
| 8 | 95 | 0 | 0 | 95 | 0 | 96 | 0 | 0 | 0 |
| 9 | 96 | 1 | 0 | 96 | 0 | 97 | 0 | 0 | 0 |
| 10 | 97 | 2 | 0 | 97 | 0 | 98 | 0 | 0 | 0 |
| 11 | 98 | 3 | 0 | 98 | 0 | 99 | 0 | 0 | 0 |
| 12 | 99 | 4 | 0 | 99 | 0 | 100 | 0 | 0 | 0 |
| 13 | 100 | 5 | 0 | 100 | 0 | 101 | 0 | 0 | 0 |
| 14 | 101 | 6 | 0 | 101 | 0 | 102 | 0 | 0 | 0 |
| 15 | 102 | 7 | 0 | 102 | 0 | 103 | 0 | 0 | 0 |
| 16 | 103 | 8 | 0 | 103 | 0 | 104 | 0 | 0 | 0 |
| 17 | 104 | 9 | 0 | 104 | 0 | 105 | 0 | 0 | 0 |
| 18 | 105 | 10 | 0 | 105 | 0 | 106 | 0 | 0 | 0 |
| 19 | 106 | 11 | 0 | 106 | 0 | 107 | 0 | 0 | 0 |
| 20 | 107 | 12 | 0 | 107 | 0 | 108 | 0 | 0 | 0 |
| 21 | 108 | 13 | 0 | 108 | 0 | 109 | 0 | 0 | 0 |
| 22 | 109 | 14 | 0 | 109 | 0 | 110 | 0 | 0 | 0 |
| 23 | 110 | 15 | 0 | 110 | 0 | 111 | 0 | 0 | 0 |
| 24 | 111 | 16 | 0 | 111 | 0 | 112 | 0 | 0 | 0 |
| 25 | 112 | 17 | 0 | 112 | 0 | 113 | 0 | 0 | 0 |
| 26 | 113 | 18 | 0 | 113 | 0 | 114 | 0 | 0 | 0 |
| 27 | 114 | 19 | 0 | 114 | 0 | 115 | 0 | 0 | 0 |
| 28 | 115 | 20 | 0 | 115 | 0 | 116 | 0 | 0 | 0 |
| 29 | 116 | 21 | 0 | 116 | 0 | 117 | 0 | 0 | 0 |
| 30 | 117 | 22 | 0 | 117 | 0 | 118 | 0 | 0 | 0 |
| 31 | 118 | 23 | 0 | 118 | 0 | 119 | 0 | 0 | 0 |
| 32 | 119 | 24 | 0 | 119 | 0 | 120 | 0 | 0 | 0 |
| 33 | 120 | 25 | 0 | 120 | 0 | 121 | 0 | 0 | 0 |
| 37 | T(Now) | | 90 | Variable - changes each block | | | | T(Now) must be larger than T(0) | |
| 38 | T(0) | | 95 | Initial Script value - fixed | | | | | |
| 39 | SCV - Const | | -5 | | | | | | |

TIME LOCK TECHNIQUE FOR SECURING A RESOURCE ON A BLOCKCHAIN

This invention relates generally to computer-implemented security and control methods, cryptography and cryptocurrencies, and distributed ledger (blockchain) technologies such as, for example, Bitcoin-related technologies. The invention is particularly suited for use in situations where it is desirable to secure a blockchain transaction output until a certain time or range of times, and also for situations where access to a controlled resource is to be allowed or denied based upon a time-related conditions In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource as determined by the context in which the term is used.

A blockchain is a peer-to-peer, electronic ledger which is implemented as a computer-based decentralised, distributed system made up of blocks which in turn are made up of transactions. Each transaction (Tx) is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

It is often advantageous to be able to control or influence when an output can be unlocked and thus spent. A number of known mechanisms can be used to incorporate time-related controls (time locks):

Absolute Time Locks:
  nLockTime
  The nLockTime transaction field can be used to specify the earliest absolute time (in terms of timestamp or the lowest block height) that the transaction may be added to a valid block on the blockchain.

CheckLockTimeVerify (CLTV)
  The CLTV opcode (OP_CHECKLOCKTIMEVERIFY) is similar to nLockTime in that it allows the specification of an absolute time lock; however, CLTV can be applied to a specific transaction output (UTXO) as opposed to a whole transaction. It is inserted into a locking/redeem script associated with the output, and locks the output's funds until a time that is specified via a single parameter passed into the CLTV op_code. When an attempt is made to spend the output, script execution will only succeed if the nLockTime applied to the transaction is equal to or greater than the time provided to the CLTV opcode via the parameter. If not, the script execution will fail. Thus, the output can only be spent when the nLockTime has passed.

Relative Time Locks:
  nSequence
  The nSequence field is similar to nLockTime, but is part of every transaction input and can be used to specify a relative lock time. nSequence specifies the earliest time it can be added to a block based on when the transaction containing the output (UTXO) that the input is trying to spend was added to the block chain CheckSequenceVerify (CSV)
  The CSV opcode allows a relative lock time to be applied to an output. When attempting to spend the output UTXO, the script execution will fail unless the nSequence time is greater than or equal to the parameter provided to the CSV opcode i.e., the output can only be added to a valid block and thus spent if the time specified by nSequence has passed.

Thus, the conventional way of providing a time lock to is obtain the nLockTime from the transaction on the blockchain and compare it with the supplied CLTV parameter (or the nSequence time and compare it with the CSV time).

While these techniques are useful, though, they do not enable or facilitate variability in relation to lock times. It would be highly advantageous to be able to use externally sourced (off-block) data for controlling how and when blockchain outputs can be unlocked, as this would provide a much improved locking/unlocking control technique.

However, it is accepted within the technical field that it is not possible to insert or inject external data into the blockchain. See, for example, page 190 of "*Understanding Bitcoin: Cryptography, Engineering, and Economics*" (Pedro Franco, John Wiley & Sons 2015) which states that "Bitcoin is a self-contained system that does not reference outside data". Moreover, existing time lock mechanisms provide a simplistic solution for controlling when an output will be unlocked, because they simply activate if the specified time has been reached, or the output remains locked if it has not. In many situations, however, it would be advantageous to have a higher degree of control of the locking/unlocking of the output, and thus when the transfer is made over the network. A more sophisticated approach is desired which allows for a higher level of granularity in terms of the conditions used to lock/unlock the resource, and/or more choice or possibilities in regard to the actions that can be taken when those conditions are met.

Prior art solutions teach the use of multiple transactions, each with its own simple time lock that specifies a different course of action that can be taken if a particular time is reached. The use of multiple time-locking transactions is disclosed, for example, in McCorry Patrick et al "Towards Bitcoin Payment Networks", 30 Jun. 2016, ECCV 2016 Conference, [Lecture Notes in Computer Science] Springer International Publishing, CHAM, Pages 57 to 76, XP047348067. McCorry teaches the use of micropayment and lightning channels to enable a plurality of possible unlocking times.

However, such arrangements can be far very complex and require significant resources to generate, process, manipulate and store the multiple transactions. For example, FIG. 3 of McCorry shows a plurality of transactions and inter-party messages that would be required to establish a lightning channel. It would be more efficient in terms of resources and time to be able to use a more sophisticated time lock mechanism contained in a single script in one transaction on the blockchain.

Such an improved solution has now been devised in accordance with the present invention, which is defined in the appended claims.

In accordance with the invention there may be provided a method (and corresponding system). It may be described or referred to as a control method. Additionally or alternatively, it may be described as a method to secure and/or unlock a resource. The resource may be associated with an output (UTXO) in a blockchain transaction (TX)). It may secure, control and/or specify the time (and/or range of times) when the UTXO can be unlocked. Other criteria or conditions may also need to be met in addition to the time-based locking requirement. Additionally or alternatively, it may control when an output may be unlocked (i.e. "spent"). Thus, it may control of a portion of cryptocurrency, or cryptographically-secured asset, or a tokenised entity associated with the output and which may be transferred from one party to another. In this way, the invention provides an improved implementation of a blockchain and/or cryptocurrency. Additionally or alternatively, it may provide an improved security mechanism for locking/unlocking a blockchain transaction (TX) or more, specifically, at least one output in a transaction.

The invention may comprise the steps of:
1. In a script of a blockchain transaction ($TX_0$), calculating a time-related value ($T_{supplied}$) using data provided from an source external to the transaction ($TX_0$)
2. Using the calculated value ($T_{supplied}$) in a time lock mechanism to ensure that unlocking of a controlled resource can only be performed at a time pre-determined time.

The time lock mechanism may be provided within the same script as the calculation. The script may be associated with an output (UTXO) of the transaction ($TX_0$), and wherein the controlled resource is associated with the output (UTXO).

In an additional or alternative wording, the invention may provide a method arranged to secure and/or unlock an output (UTXO) in a blockchain transaction ($TX_0$). The method may comprise the step:
using a time lock mechanism to control or influence when the output (UTXO) can be unlocked;
wherein the time lock mechanism uses a parameter ($T_{supplied}$) that is generated as the result of a calculation using an input (A).

In another additional or alternative wording, the invention may comprise: arranging a locking script in a blockchain transaction such that it takes an input (i.e. value) and uses that input in a calculation. The calculation may perform a mathematical operation on the input. The calculation may produce a time-related result which may then be used as the input for a time lock mechanism (e.g. comprising CLTV, CSV and/or nLockTime). This may ensure that the output is only spendable at a given time in accordance with at least one condition that has been written into the locking/redeem script.

Additionally or alternatively, the invention may be described as comprising:
a method arranged to secure or unlock an output (UTXO) in a blockchain transaction ($TX_0$), comprising:
i) providing an input (A) to a calculation, to output a result ($T_{supplied}$);
and/or
providing or using a calculation to generate a result ($T_{supplied}$) based upon an input (A);
and
ii) using result ($T_{supplied}$) as a parameter to a time lock mechanism arranged to control or influence when the output (UTXO) can be unlocked.

Additionally or alternatively, the invention may be described as comprising: a method of securing or unlocking an output (UTXO) in a blockchain transaction ($TX_0$) until a particular time or period of time, comprising the step of:
using a time-based parameter or value ($T_{supplied}$) as an input to a time lock mechanism, wherein:
the time lock mechanism comprises a combination of CLTV and CSV operations or functionally similar/equivalent operations dependent upon the blockchain protocol being used.

The above provides the advantage that a variable input can be received from a source external to the blockchain and used by a script in a transaction on the blockchain to determine when the controlled resource can be released.

The locking script may be used to lock an output in a blockchain transaction. The transaction may be submitted to and/or recorded on the blockchain.

The result of the calculation may be used in a conditional statement or test which is provided in the script. This provides the advantage that different time-related inputs, provided by the unlocking script, can produce different results or behaviours.

According to one or more embodiments, the time lock mechanism may comprise a portion of code which includes:
$T_{supplied}$(CLTV); or
NOT[$T_{supplied}$(CLTV)]+1; or
$T_{supplied}$(CLTV) AND [NOT($T_{supplied}$(CLTV))+1]; or
$T_{supplied}$(CLTV) AND [NOT($T_{supplied}$(CLTV))+1] AND $T_{supplied}$(CSV)

The locking script may comprise a redeem script. The redeem script may comprise the calculation and/or code for executing the time lock mechanism.

Preferably, the input (A) is provided from an external source. The external source may be external relative to the locking/redeem script. It may be an off-block source.

The calculation may provide a result which ensures that the time lock mechanism only permits unlocking of the output (UTXO) when a desired, predetermined time has been reached. This may be predetermined at or prior to the time of creating the locking script. The result may be based on or influenced by a time-related value. That may be referred to herein as $T_{supplied}$.

The time lock mechanism may be referred to as a "time lock technique" or "time lock logic" in alternative wordings. The time lock mechanism may comprise a relative and/or an absolute time lock mechanism or combination thereof. These may be the nLockTime, CSV and/or CLTV operations in embodiments which are implemented on blockchains which use these operations. Bitcoin and variations thereof. In embodiments which use other blockchain protocols and platforms, the time lock mechanisms may comprise operations that are substantially equivalent or similar in functionality to CSV/CLTV. Additionally or alternatively, the time lock mechanism may comprise an nLockTime (or functionally similar/equivalent) mechanism or field.

The parameter ($T_{supplied}$) may be a number; it may be a 32-bit number. The parameter ($T_{supplied}$) may be based upon, or be representative of:

at least one blockchain block number or height, or a range thereof; or a time-stamp, numeric representation of a time; or a range thereof;

a timestamp;

an integer (e.g. 32-bit integer);

Unix-based time format; and/or any time-related value which can be used as an input to the time lock mechanism.

$T_{supplied}$ may be calculated using the calculation:

$$-\text{Hash}(A)+X=T_{supplied}$$

Where A is a secret value and X is an offset value.

The method may comprise the step of using a portion of logic to process input (A) prior to it being used in the calculation. The portion of logic may be provided in a locking script associated with the output (UTXO). The portion of logic may comprise at least one Boolean operation.

One or more embodiments of the invention may comprise the step of:

using the time lock mechanism to evaluate or influence the result of a conditional operation such that a specified event is triggered when the condition or test evaluates to TRUE. The conditional operation may be an IF operation that returns a Boolean result based on one or more inputs. This provides the advantage that the script can be used to dictate and enforce complex functionalities and behaviours based upon time. For example:

---
If (<condition 1> on date 1)
Then do action1;
If (<condition2> on date 2)
Then do action2
---

As explained above, this is achieved within a script of a single transaction, in contrast to prior art techniques.

The calculation may be provided in a locking script associated with the output (UTXO).

Input (A) may be provided via an unlocking script associated with an input (In) in a further blockchain transaction ($TX_1$). The input (In) may be used in an attempt to spend the output (UTXO) in the first transaction ($TX_0$).

The calculation may be arranged such that it will generate a value for a time-based result ($T_{supplied}$) upon provision of a specific value for input (A). The calculation may comprise a mathematical operator. The calculation may operate upon a plurality of operands. One of the operands may be the input (A). One of the other operands may be a hash function. In contrast, prior art techniques simply The invention also provides a computer-implemented system arranged or configured to implement any embodiment of the method described herein. Any feature(s) mentioned in respect of the method may also be applied to the corresponding system.

The invention also provides a system, comprising:

a processor; and memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

Any feature(s) mentioned above in respect of one form of wording, embodiment or aspect may also apply to other wording, embodiment or aspect.

These and other aspects of the present invention will be apparent from and elucidated with reference to, the embodiment described herein. An embodiment of the present invention will now be described, by way of example only, and with reference to the accompany drawings, in which:

FIGS. 2 to 6 show spreadsheets populated with different values for $T_{supplied}$, and their respective results when used in conjunction with CLTV and/or CSV time lock mechanisms.

DETAILED DESCRIPTION

Figure 1:
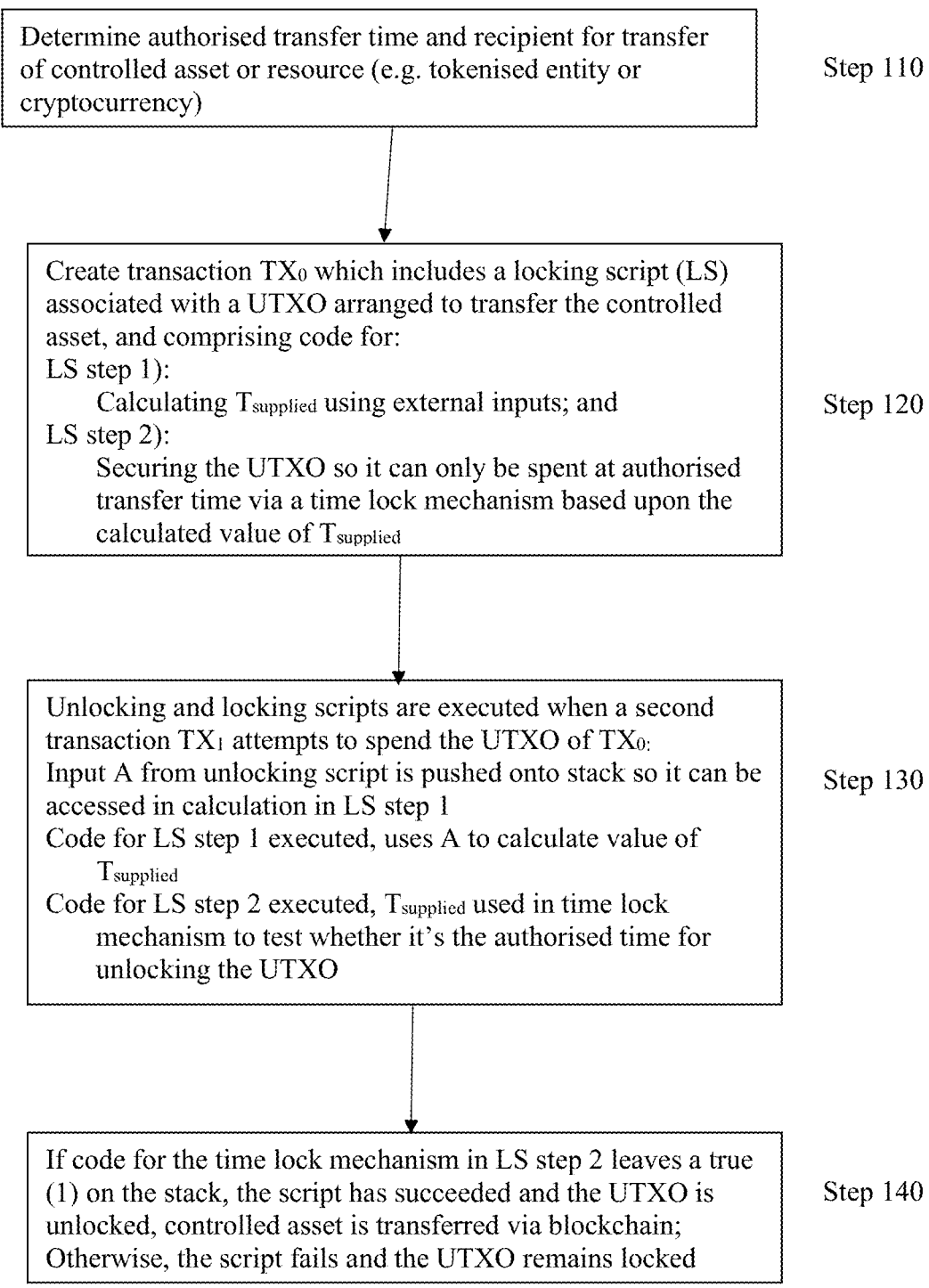
FIG. 1 is a flowchart illustrating an overview of an embodiment of the invention.

The invention comprises a solution for securing an (unspent) output in a blockchain transaction so that it can only be unlocked by an authorised party at an allowed time, and in accordance with external data supplied to the transaction script. This external data can be provided by the authorised party.

The invention essentially comprises two steps which are implemented within the UTXO's locking script:

1. Calculation of a time-related value (which we will call $T_{supplied}$) using the external data provided
2. Use of the calculated $T_{supplied}$ value in a time lock technique to ensure that unlocking occurs at a time pre-determined time.

There are numerous advantages which flow from the present invention, these include (but are not limited to):

The provision of a variable nLockTime mechanism

The invention provides a variable lock time mechanism which can be implemented on the blockchain within a single transaction. It does not require complex, resource intensive payment channels or second layer solutions to be developed on top of the blockchain; thus it provides a secure, cryptographically enforced solution which is efficient in terms of resources and processing, and can be implemented on existing blockchain platforms without requiring changes to the underlying protocol;

Greater flexibility and a more sophisticated degree of control with regard to how and when an output can be unlocked, and by whom;

i.e. the invention provides an enhanced technique for controlling how, when and to whom a transfer can be made across the network, The ability to specify transfers which are only valid for a particular block/time; or plurality or range of blocks/time period(s);

Greater ability to specify that a particular time a certain blockchain-related event (or events) will occur;

The ability to perform calculations and mathematical/logical operations on time-related values within the script The ability to set up any combination of allowable spending (i.e. transfer) configurations within a single script set up and activate scripts which incentivise pre-defined desired behaviours the necessary logic and operations to implement the invention can be provided within a transaction script, which can be recorded on the blockchain in the conventional manner;

the invention does not require any adaptation to, extension of or other reconfiguration of the existing (e.g. Bitcoin) blockchain protocol or platform.

Step 1: Calculation of $T_{supplied}$

For the purposes of explanation and illustration only, we now provide an example of one embodiment which can be used to put the invention into effect. In this example, we assume that the invention is put into effect on any variant of the Bitcoin blockchain, and so we use CLTV and CSV as the time lock mechanisms. However, other embodiments and implementations may use alternative blockchain platforms and operations to the same effect, while still falling within the scope of the claimed invention. Such alternative protocols may provide time lock mechanisms which have different identifiers or slightly different functionalities but still fall within the scope of the invention because they enable time-based locking of a transaction output.

In this document, we use the term "time" to include any of these options, and any other option which relates in some way to a point or range of points in time or when one or more events occur.

In our example scenario, we assume that:

There are a group of n participants in a m-of-n Dealerless Distribution scheme. Dealerless distribution schemes are known in the art.

A UTXO is created paying to the group's public key and a transaction 'puzzle' (note that the puzzle is designed to be variable)

Threshold (m members) subgroups collaborate to transfer control of the UTXO by off-block mechanisms. This is achieved by enabling different subgroups to have exclusive solutions to the puzzle under different conditions e.g. at different time periods or block numbers. Therefore, the goal is to allow different parties to be able to spend the UTXO and unlock its funds when respective criteria are met.

Suppose that a dealerless scheme has been used to establish an unknown private key and an associated known public key. A Bitcoin transaction $TX_0$ is created which includes an output (UTXO). The portion of cryptocurrency associated with this UTXO is locked with a locking script as follows:

<input to redeem-script>[redeem script]

where the redeem script includes a calculation along the lines of:

$-H(A)+X=T_{supplied}$ and where H(A) stands for Hash of A and where <input to redeem-script> may include values such as:

Signature $A$ $X$

Therefore, the party attempting to spend the output will need to supply these three inputs to meet the criteria for the redeem script and unlock the UTXO.

Therefore, in contrast to the prior art, embodiments of the invention provide a mathematical calculation within a (single) script that secures a controlled resource (eg cryptocurrency funds, tokenised asset, etc) by requiring an authorised user to provide a value via an unlocking script that will cause the calculation to produce a result which, when subsequently fed into a time lock mechanism, will result in a TRUE and thus unlock the resource. The calculation comprises a mathematical operation, which operates on multiple operands (i.e. −H(A) and X described above) and will produce a result that is dependent upon the values of the operands. Thus, the script provides a mechanism for inputting some value during an unlocking attempt to produce a variable result which is then used in the time lock mechanism.

In the redeem script, $T_{supplied}$ represents a specific time or period, or a specific block number or range of block numbers. It is the time at which the user (spender of the UTXO) wishes to unlock and spend the output (UTXO). T can be locked within the script by a combination of the time lock mechanisms CLTV and CSV—i.e. it is the parameter value passed into the CLTV/CSV locking technique that is described in more detail below in the section entitled "Step 2: Using $T_{supplied}$ In A Time Lock Mechanism".

A is a secret number. Subgroup-A are the only set of participants who can derive A (collaboratively) and therefore can spend the UTXO (if they can provide the other unknowns).

X is an offset value to enable the target $T_{supplied}$ value to be established via the calculation within the locking script. Subgroup-A knows the value of A and the value of the target value $T_{supplied}$ in advance, but does not know the value of X. Therefore, it only knows two of the three inputs required. However, subgroup-A can derive the offset, X, using the equation:

$$X=T_{supplied}+H(A)$$

Therefore, all values for the required inputs are available to subgroup-A.

For example, suppose that a target value for T (i.e. the time at which the output will be spendable if conditions/criteria are met) has been decided by the collaborating subgroups (m members) as block number 700,000. In another example, a time other than that block number could be used. The m members then devise a calculation which will be inserted into the redeem script, and which will evaluate to produce a result wherein T=700000. The redeem script will then use this result $T_{supplied}$, 700000, as the parameter (input value) for the CLTV/CSV time lock combination within the script.

The secret value A and the target value T are known by the subgroup creating the transaction (i.e. subgroup-A). Therefore, subgroup-A can calculate the required value for X from:

$$X=700000+H(A)$$

Thus, the values for A and X are now both available to an authorised spender (subgroup-A) of the UTXO and can be passed into the redeem script via the unlocking script of a further transaction $TX_1$ along with the relevant signature, as explained above.

The purpose of the redeem script and its supplied inputs is that only those who know the secret value of A (i.e. subgroup-A) can unlock the transaction and only at the block number 700,000. For this to work, part of the locking script will need to validate the value of A by comparing its hash with a stored hash value that is written into the locking script.

Pseudocode for the locking script can thus be expressed along the lines of:
Push input values to the stack
Hash the A value passed in (call it $A_{in}$) to create $H(A_{in})$
  Compare $H(A_{in})$ with the internally stored value $H(A)$. If no match abort.
Calculate $T_{supplied}$ using $T_{supplied} = -H(A)+X$
The calculated $T_{supplied}$ value is used as input for the CLTV and CSV locking mechanisms (described in more detail below in section "Step 2: Using $T_{supplied}$ In A Time Lock Mechanism")
Check the signature Therefore, the invention provides a variable nLockTime mechanism which was not previously possible. An improved transfer control mechanism has therefore been devised in accordance with the invention.

The simple case explained above can be extended to provide more complex and sophisticated control behaviours, because mathematical and logical operations can be performed on the values. For example, any subgroup of the full dealerless group can derive the required signature (providing the number of members reaches the threshold) and any subgroup can create their own secret A value. Accordingly, several subgroups can collaborate to make the transaction spendable at different T values (e.g. for different block numbers) locked to specific subgroups.

For example, suppose that $subgroup_0$ want to be able to spend the transaction at time $T_0$; $subgroup_1$ want to be able to spend the transaction at time $T_1$; $subgroup_2$ want to be able to spend the transaction at time $T_2$. Each $subgroup_n$ can have their own secret value $A_n$, and each subgroup can set their own $T_n$ target block number and calculate their own $X_n$ value:

$$X_n = T_n + H(A_n)$$

For example, the transaction is to be locked to $subgroup_0$ at block number 700,000; $subgroup_1$ at 700,001 and $subgroup_2$ at 700,002. The transaction can be unlocked by any unlocking script with values:

Signature $A_n$ $X_n$ where $X_n$ is calculated as:
$X_0 = 700000 + H(A_0)$
$X_1 = 700001 + H(A_1)$
$X_2 = 700002 + H(A_2)$ For this to work, each of the $A_n$ hashes $H(A_n)$ must be contained in the script and individually checked with a conditional IF or 'OR' operation. In other words:
Abort if not $H(A_{in}) = H(A_0)$ OR $H(A_{in}) = H(A_1)$ OR $H(A_{in}) = H(A_2)$ The person skilled in the art will understand that, upon prior agreement of all subgroups when setting up the transaction's locking script, any combination of allowable spending configurations can be created. For example:
The target T values (e.g. block numbers) need not be consecutive
The target T values could represent a range of block numbers or time periods
Different subgroups may be allowed to spend at the same T value (each $subgroup_n$ will have a different value for $X_n$ calculated from the same T value).
(etc.)

In another example, the above could be extended to restrict spend attempts to nearer the target time. Consider the case wherein we require subgroup-A to supply a further input to the script, B, which represents a value that can only be known at or near the target time period. For example, B could be the block hash of the block six blocks back from the target block number. Other examples could be thought of in which the value B is only communicated or made available/derivable to the authorised spender at or around a given time. In the block hash example, the intention is that the values needed for the unlocking script cannot be derived before approximately one hour prior to the existence of the target block.

In this case, the redeem script includes:

$$-[H(A)+H(B)]+X=T$$

and subgroup-A would need to create values which satisfy <input to redeem-script>:

Signature $A$ $B$ $X$

Once the value of B becomes available from the blockchain, subgroup-A can use the equation $-[H(A)+H(B)]+X=T$ to derive the offset, X, because the secret value A and the also known by subgroup-A. Assuming that the spend attempt is being performed within one hour of the target block (and therefore the B value is known), the required value for X can be calculated from:

$$X = 700000 + H(A) + H(B)$$

Therefore, subgroup-A now knows all of the information required to create the unlocking script which supplies the correct inputs to satisfy the conditions of the redeem script and unlock the output.

The present invention enables the above to be achieved securely and via a single transaction on the blockchain, without the need to establish complex and less efficient second layer solutions such as payment channels.

Step 2: Using $T_{supplied}$ In A Time Lock Mechanism

Once the value for $T_{supplied}$ has been calculated in the script using external input(s) supplied via the unlocking script, that value can be used in a time locking technique to ensure that the UTXO can only be unlocked at the desired time or within the desired range of times.

The present invention can be arranged to use either the CLTV operation, or the CSV operation, or a combination thereof. Each of the approaches, however, use some common, shared features:
The $T_{supplied}$ value calculated earlier in the locking script is used in a subsequent calculation for the time locking purposes; as explained, this is the value provided to the script from the external source.
We use a time $T_0$ as a constant in the locking script. This is the initial (i.e. script starting) time, and hence any value lower than $T_0$ will evaluate to false as it cannot occur prior to the first time that the locking script appears as a transaction on the blockchain. This fixed value is added to the locking script when it is written and cannot be varied.
We use $T_{now}$ to refer to the current time. In our examples, this is the block height on the blockchain as in this moment, and is the actual time as recorded on the consensus of blocks. In other words, it is the nLocktime from the network and not something that can be spoofed. This provides a technical effect which ensures security of the controlled output.

$T_{now}$ is variable rather than fixed, and changes with each block. $T_{now}$ (the current time) must be larger than $T_0$ (the initial/starting time). The current time, however, may be measured or represented in a variety of ways and formats. It may be obtained from a variety of off-block or on-block sources. It can be represented as a numeric value, and can lend itself for use in mathematical calculations and in-script manipulations.

CLTV and CSV both work if the time calculated using the data provided from the external source has past. That is $T_{supplied} <= T_{now}$.

Where $T_{supplied} > T_{now}$, the script is invalid and fails. So any use of a calculated time that is greater than the current time fails. However, we can create a set of logical operations to capture these such scenarios.

Referring to FIGS. 2 to 6, it can be seen that there only is only one scenario where $T_{supplied}$ and $T_{now}$ lead to a single accepted value. The only valid scenario is when the current time has been arrived at.

FIGS. 2 to 6 show, for the purposes of illustration, how various time lock mechanisms can be used to secure the spendable output to a certain time/range.

In each of FIGS. 2 to 6:
Column A, row 37 shows a given value for $T_{now}$
Column A, row 38 shows a given value for the initial time constant, To
Column A, rows 3 to 33 show different values of $T_{supplied}$ as calculated within the script using the input provided by the external source via the unlocking script The formulae in the spreadsheet cells are as follows:

| Cell # | Heading | Formula |
|---|---|---|
| B3 | T(CSV) | =A3-$B$38 |
| C3 | | =IF((($B$39 >= B3)*AND(B3 >= 0)), 1, 0)<br>The result after the operation<br>(1 = True, 0 = False; if true the script succeeds, UTXO is unlocked; if 0, the script fails and the UTXO remains locked) |
| D3 | T(CLTV) | =A3 |
| E3 | | =IF(D3 <= $B$37, 1, 0)<br>the result of the CLTV operation |
| F3 | NOT [T(CLTV) − 1] B | =D3 + 1 |
| G3 | | =IF((F3 <= $B$37), 1, 0) |
| H3 | (A). NOT (B) | =IF(AND(E3, NOT(G3)), 1, 0) |
| I3 | (A).NOT (B). (C) | =IF(AND(AND(E3, NOT(G3), C3)), 1, 0) |
| B39 | SCV - Const | =B37-B38 |

FIG. 2 shows the time lock outputs, for various values of $T_{supplied}$, when $T_{now}$ is 108 and $T_0$ is 100. Note that the script is only valid and evaluates to a True (i.e. 1) result (in columns H and I) in row 21, when $T_{supplied}$ is 108.

FIG. 3 shows the time lock outputs, for various values of $T_{supplied}$, when $T_{now}$ is 118 and $T_0$ is 117.

FIG. 4 shows the time lock outputs, for various values of $T_{supplied}$, when $T_{now}$ is 115 and $T_0$ is 100. Note that the script only evaluates to a True (i.e. 1) result (in columns H and I) in row 28, when $T_{supplied}$ is 115.

FIG. 5 shows the time lock outputs, for various values of $T_{supplied}$, when $T_{now}$ is 115 and $T_0$ is 95

FIG. 6 shows the time lock outputs, for various values of $T_{supplied}$, when $T_{now}$ is 90 and $T_0$ is 95. Note that in this case the value of $T_{now}$ is less than the value of $T_0$, which is not valid. Thus, there are no True ("1") results in either column H or column I.

In embodiments where the time lock mechanism uses a CLTV operation, $T_{CLTV}$ (output shown in column D in FIGS. 2 to 6) is based on $T_{Supplied}$.

In embodiments where the time lock mechanism uses a CSV operation, $T_{CSV}$ (as shown in column B of FIGS. 2 to 6) is calculated as:

$$T_{CSV} = T_{Supplied} - T_0$$

This calculation is complete within the script, and not supplied by the user/spender via an input. The user/external source only provides inputs to influence the calculation of $T_{Supplied}$.

In certain embodiments, the time lock mechanism comprises a combined CSV and CLTV operation. These are shown in columns F to I of FIGS. 2 to 5.

Figure 7:
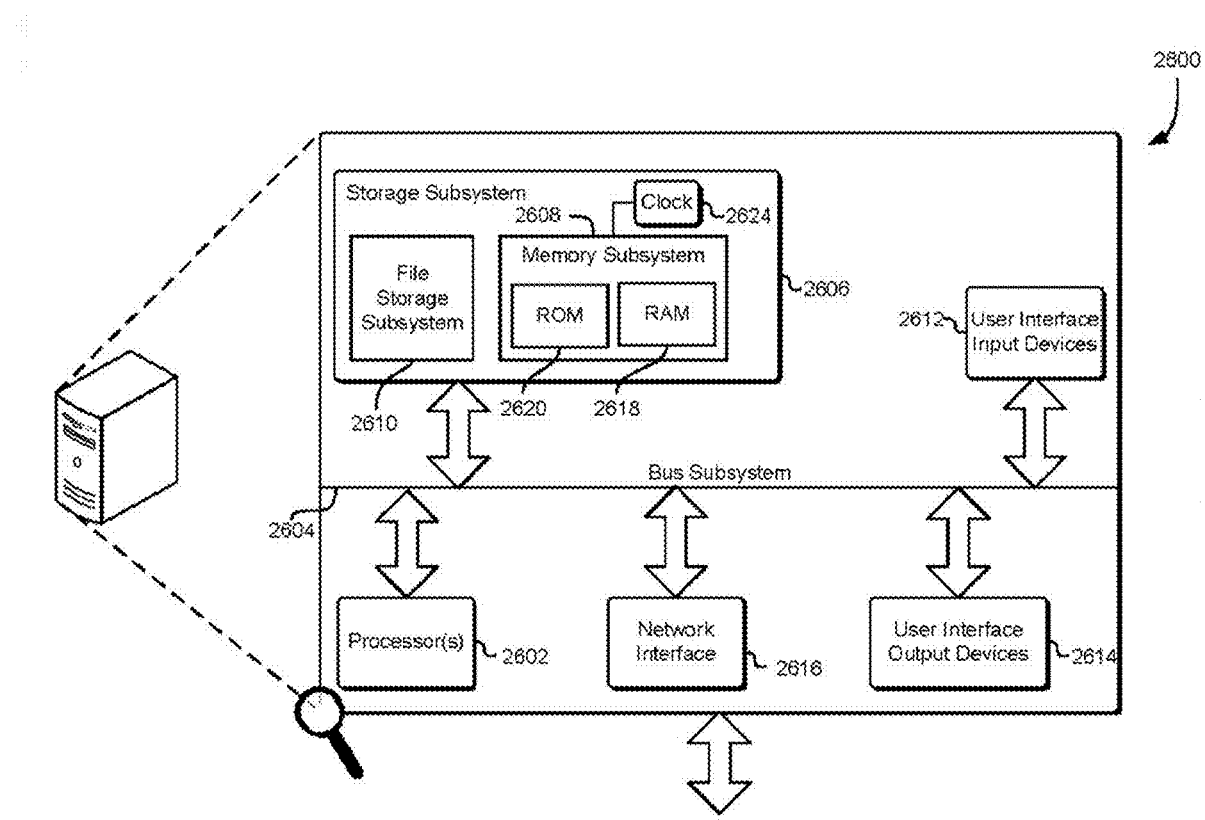
FIG. 7 is a schematic diagram illustrates a computing environment in which various embodiments can be implemented.

Turning now to FIG. 7, we provide an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized for the method(s) as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended.

Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data.

The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for 7 as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method to secure or unlock an output (UTXO) in a blockchain transaction ($TX_0$), comprising:
   using a variable time lock mechanism to control or influence a time T when the output (UTXO) can be unlocked,
   wherein the variable time lock mechanism uses a value ($T_{supplied}$) that is generated upon provision of a specific value for an input (A) in a form of data which is subsequently supplied by a source external to said blockchain transaction ($TX_0$) and as a result of a calculation that uses the input (A),
   wherein the calculation and the variable time lock mechanism are provided in a locking script associated with the output (UTXO), and wherein the input (A) used to determine the value ($T_{supplied}$) is provided via an unlocking script associated with an input (In) in a further blockchain transaction ($TX_1$) that is different to the blockchain transaction ($TX_0$) which the calculation and the variable time lock mechanism are provided in,
   wherein a controlled resource associated with the output (UTXO) is unlocked in response to ensuring, by the variable time lock mechanism based on the value ($T_{supplied}$), that a requirement of a pre-determined time range is met within which the output (UTXO) is expected to be unlocked,
   wherein the variable time lock mechanism comprises a portion of code which includes:
   NOT[$T_{supplied}$(CLTV)−1]; or
   $T_{supplied}$(CLTV) AND NOT(NOT[$T_{supplied}$(CLTV))−1]); or
   $T_{supplied}$(CLTV) AND NOT(NOT[$T_{supplied}$(CLTV))−1]) AND $T_{supplied}$(CSV); and
   wherein:
   CLTV is a CheckLockTimeVerify operation code (opcode),
   CSV is a CheckSequenceVerify opcode, and
   using the variable time lock mechanism is based at least in part on a hash function operated on the input (A).

2. A method according to claim 1, wherein:
   the source that supplies the input (A) is external to a locking script (LS) which is associated with the output (UTXO).

3. A method according to claim 1, wherein:
   the variable time lock mechanism only permits unlocking of the output (UTXO) when a desired time or range of times has been reached.

4. A method according to claim 1, wherein:
   the calculation comprises a mathematical operator, and the calculation operates upon a plurality of operands.

5. A method according to claim 4, wherein at least one of the operands is a hash function.

6. A method according to claim 1, wherein:
the variable time lock mechanism comprises a Bitcoin CSV and/or CLTV operation, or other functionally similar operation from a blockchain protocol other than Bitcoin.

7. A method according to claim 1, wherein:
the value ($T_{supplied}$) relates to, comprises or represents:
at least one block number or height, or a range thereof; or
a time-stamp, numeric representation of a specific time; or
a range thereof.

8. A method according to claim 1, further comprising a step of:
using a portion of logic to process, operate on or use the input (A) prior to it being used in the calculation, wherein:
i) the portion of logic is provided in a locking script associated with the output (UTXO); and/or
ii) the portion of logic comprises at least one Boolean operation.

9. A method according to claim 1, and further comprising a step of:
using the variable time lock mechanism to evaluate the result of a conditional operation such that an event is triggered when the conditional operation evaluates to TRUE.

10. A method to secure an output (UTXO) in a blockchain transaction ($TX_0$), comprising:
i) providing a first input (A) in a form of data to a calculation, to output a result ($T_{supplied}$), and/or providing or using a calculation to generate a result ($T_{supplied}$) based upon a first input (A) subsequently supplied by a source external to said blockchain transaction ($TX_0$); and
ii) using the result ($T_{supplied}$) as a parameter to a variable time lock mechanism arranged to control or influence when the output (UTXO) can be unlocked by:
providing the calculation and the variable time lock mechanism in a locking script associated with the output (UTXO);
providing the first input (A) via an unlocking script associated with a second input (In) in a further blockchain transaction ($TX_1$); and
unlocking a controlled resource associated with the output (UTXO) in response to ensuring, by the variable time lock mechanism based on the result ($T_{supplied}$) that a requirement of a pre-determined time range is met within which the output (UTXO) is expected to be unlocked,
wherein the variable time lock mechanism comprises a portion of code which includes:
NOT[$T_{supplied}$(CLTV)−1]); or
$T_{supplied}$(CLTV) AND NOT(NOT[$T_{supplied}$(CLTV)−1]); or
$T_{supplied}$(CLTV) AND NOT(NOT[$T_{supplied}$(CLTV)−1]) AND
$T_{supplied}$(CSV); and
wherein:
CLTV is a CheckLockTimeVerify operation code (opcode);
CSV is a CheckSequenceVerify opcode; and
using the variable time lock mechanism is based at least in part on a hash function operated on the first input (A).

11. A method of securing or unlocking an output (UTXO) in a blockchain transaction ($TX_0$) until a particular time or period of time, comprising the step of:
using a time-based value ($T_{supplied}$) as a first input to a variable time lock mechanism, wherein:
the variable time lock mechanism comprises a combination of CLTV and CSV operations or functionally similar/equivalent operations dependent upon a blockchain protocol being used;
the variable time lock mechanism comprises a portion of code which includes:
NOT[$T_{supplied}$(CLTV)−1]); or
$T_{supplied}$(CLTV) AND NOT(NOT[$T_{supplied}$(CLTV)−1]); or
$T_{supplied}$(CLTV) AND NOT(NOT[$T_{supplied}$(CLTV)−1]) AND
$T_{supplied}$(CSV);
wherein:
CLTV is a CheckLockTimeVerify operation code (opcode),
CSV is a CheckSequenceVerify opcode;
the time-based value ($T_{supplied}$) is generated, upon provision of a specific value for a second input (A) in a form of data and subsequently supplied by a source external to said blockchain transaction ($TX_0$) and as a result of a calculation that uses the second input (A), wherein using the variable time lock mechanism is based at least in part on a hash function operated on the second input (A);
the calculation and the variable time lock mechanism are provided in a locking script associated with the output (UTXO) and the second input (A) is provided via an unlocking script associated with a third input (In) in a further blockchain transaction ($TX_1$); and
a controlled resource associated with the output (UTXO) is unlocked in response to ensuring, by the variable time lock mechanism based on the time-based value ($T_{supplied}$) that a requirement of a pre-determined time range is met within which the output (UTXO) is expected to be unlocked.

12. A computer-implemented system, comprising:
a processor; and
memory including executable instructions that, as a result of execution by the processor, causes the computer-implemented system to perform the method of claim 1.

13. A non-transitory computer-readable storage medium having stored thereon executable instructions that, as a result of being executed by a processor of a computer system, cause the computer system to at least perform the method of claim 1.

14. A computer-implemented system, comprising:
a processor; and
memory including executable instructions that, as a result of execution by the processor, causes the computer-implemented system to perform the method of claim 11.

15. A non-transitory computer-readable storage medium having stored thereon executable instructions that, as a result of being executed by a processor of a computer system, cause the computer system to at least perform the method of claim 11.

* * * * *